US011461761B2

(12) United States Patent
Jaeb et al.

(10) Patent No.: US 11,461,761 B2
(45) Date of Patent: Oct. 4, 2022

(54) SYSTEM FOR CONDUCTING TRANSACTIONS INDEPENDENT OF POINT OF SALE SYSTEM

(71) Applicant: CityCheers Media Corp., San Jose, CA (US)

(72) Inventors: Winston Jaeb, San Jose, CA (US); D'arcy J. Laforge, San Jose, CA (US); Chris Windle, Cupertino, CA (US)

(73) Assignee: CityCheers Media Corp., San Jose, CA (US)

( * ) Notice: Subject to any disclaimer, the term of this patent is extended or adjusted under 35 U.S.C. 154(b) by 0 days.

(21) Appl. No.: 16/835,188

(22) Filed: Mar. 30, 2020

(65) Prior Publication Data

US 2020/0226580 A1    Jul. 16, 2020

Related U.S. Application Data (63) Continuation-in-part of application No. 16/397,980, filed on Apr. 29, 2019, now abandoned, which is a continuation of application No. 14/866,622, filed on Sep. 25, 2015, now Pat. No. 10,275,759.

(60) Provisional application No. 62/056,336, filed on Sep. 26, 2014.

(51) Int. Cl.
    *G06Q 20/36*    (2012.01)
    *G06Q 20/32*    (2012.01)

(52) U.S. Cl.
    CPC ........... *G06Q 20/325* (2013.01); *G06Q 20/36* (2013.01)

(58) Field of Classification Search
    USPC ..................................... 705/35, 39
    See application file for complete search history.

(56) References Cited

U.S. PATENT DOCUMENTS

| | | | |
|---|---|---|---|
| 9,928,518 B1* | 3/2018 | Vippagunta | G06Q 20/3224 |
| 9,972,004 B1* | 5/2018 | Donavalli | G06Q 20/3224 |
| 2010/0250376 A1 | 9/2010 | Nandiraju | |
| 2011/0039585 A1 | 2/2011 | Rouse et al. | |
| 2012/0136796 A1* | 5/2012 | Hammad | G06Q 20/12 705/67 |
| 2013/0103587 A1 | 4/2013 | Labaton | |
| 2013/0262269 A1* | 10/2013 | O'Leary | G06Q 10/08 705/26.81 |
| 2014/0074605 A1 | 3/2014 | Sanchez et al. | |
| 2014/0229339 A1 | 8/2014 | Massiere et al. | |
| 2014/0330654 A1* | 11/2014 | Turney | G06Q 20/3224 705/15 |
| 2015/0032623 A1 | 1/2015 | Friedman et al. | |

(Continued)

*Primary Examiner* — William E Rankins
(74) *Attorney, Agent, or Firm* — Innovation Counsel LLP (57) ABSTRACT

A method of conducting transactions between a customer device and a merchant device is presented. The method entails receiving login information from the customer device at a merchant venue, assigning a ticket to the customer device, receiving, from a merchant device, a predetermined amount of currency associated with the customer device, associating the predetermined amount of currency with the ticket, receiving, from the customer device, an approval to carry out a financial transaction for at least the predetermined amount of currency using a payment card number, and receiving, from a gateway, a notification that the financial transaction is completed using the payment card number.

18 Claims, 4 Drawing Sheets

(56) References Cited

U.S. PATENT DOCUMENTS

2015/0287006 A1\* 10/2015 Hunter .................. G06Q 20/32
705/21

\* cited by examiner

SYSTEM FOR CONDUCTING TRANSACTIONS INDEPENDENT OF POINT OF SALE SYSTEM

CROSS REFERENCE TO RELATED APPLICATIONS

This application is a continuation-in-part of U.S. patent application Ser. No. 16/397,980 filed on Apr. 29, 2019, which is a continuation application of U.S. patent application Ser. No. 14/866,622 filed on Sep. 25, 2015, which claims priority to and the benefit of U.S. Provisional Patent Application No. 62/056,336 filed on Sep. 26, 2014, all of which are hereby incorporated by reference in entirety.

BRIEF DESCRIPTION

Embodiments of the present disclosure relate generally to electronic transactions. More specifically, embodiments of the present disclosure relate generally to systems for conducting electronic transactions independent of point of sale systems.

BACKGROUND

Modern Point of Sale (POS) systems have greatly increased the ease and convenience with which many modern financial transactions are conducted. By providing a single location at which a customer's bill is totaled, payment is taken, corresponding records are stored, and a receipt is issued, POS systems allow customers and merchants to complete and record their transactions quickly and easily.

POS systems are, however, not without their drawbacks. POS systems can be expensive and burdensome for merchants to install or implement. Numerous different POS systems exist, many of which do not accept every payment form. POS systems also often rely on a single piece of hardware, such as a register, that requires customers to move to that location to conduct their transactions. Attempts to solve this problem by implementing multiple POS registers at a single merchant incur significant expense due to the added hardware required.

Conventional online fixes for these problems typically involve use of a mobile application program, or mobile app, that customers can download and that allow customers to pay online through the mobile app. However, such mobile apps present their own challenges. For example, payment services often require customers to use their app, so that each app only allows payment through a single service. Customer payments are also sent to an account run by that payment service, rather than the bank account of the customer's choice. Also, the requirement to download and install an app can lead to clutter if a customer desires to use multiple different payment services at different times, and thus must download/install multiple apps just for payment. Finally, app download and installation may simply require time and effort that customers do not wish to invest, and can compromise customer security if the app is ever compromised.

Ongoing efforts thus exist to improve the ways by which customers and merchants conduct transactions.

SUMMARY

A computer-implemented method of conducting transactions between a customer device and a merchant device is presented. The method entails receiving login information from the customer device at a merchant venue, assigning a ticket to the customer device, receiving, from a merchant device, a predetermined amount of currency associated with the customer device, associating the predetermined amount of currency with the ticket, receiving, from the customer device, an approval to carry out a financial transaction for at least the predetermined amount of currency using a payment card number, and receiving, from a gateway, a notification that the financial transaction is completed using the payment card number.

One or more non-transitory computer-readable media collectively storing instructions that, when executed, cause one or more computers to perform the above-described method is also presented.

BRIEF DESCRIPTION OF THE FIGURES

For a better understanding of the invention, reference should be made to the following detailed description taken in conjunction with the accompanying drawings, in which.

Like reference numerals refer to corresponding parts throughout the drawings. The various Figures are not necessarily to scale.

DETAILED DESCRIPTION

One embodiment of the inventive concept provides a system that allows customers and merchants to conduct electronic transactions without need for a POS system. Merchants employ a merchant interface program (such as a mobile application, native application, or a website) implemented on a computing device (e.g., portable device) independent of their POS software. system. Also employed is a merchant-specific customer interface program (such as a mobile application, native application, or a website) that customers can access with their devices, such as mobile devices. The merchant interface program and the customer interface program work together to allow customers to pay their bill through the server (e.g., City Cheers server), not through the POS system. In particular, the merchant's interface program records the amount owed by the customer and transmits this amount to the website. The customer can then pay his/her amount owed electronically, through the server, immediately and on premises, without need for the POS system. In this manner, customers can pay conveniently at their table, for example, without moving to the POS register and even without need for the merchant to physically present customers their bills. Also, in the cases where the customer interface is a website rather than a mobile app, customers can pay by accessing a website.

Systems of embodiments of the invention also allow for convenient online storage of payment card information, allowing the system to act as a digital wallet solution for customers.

Figure 1:
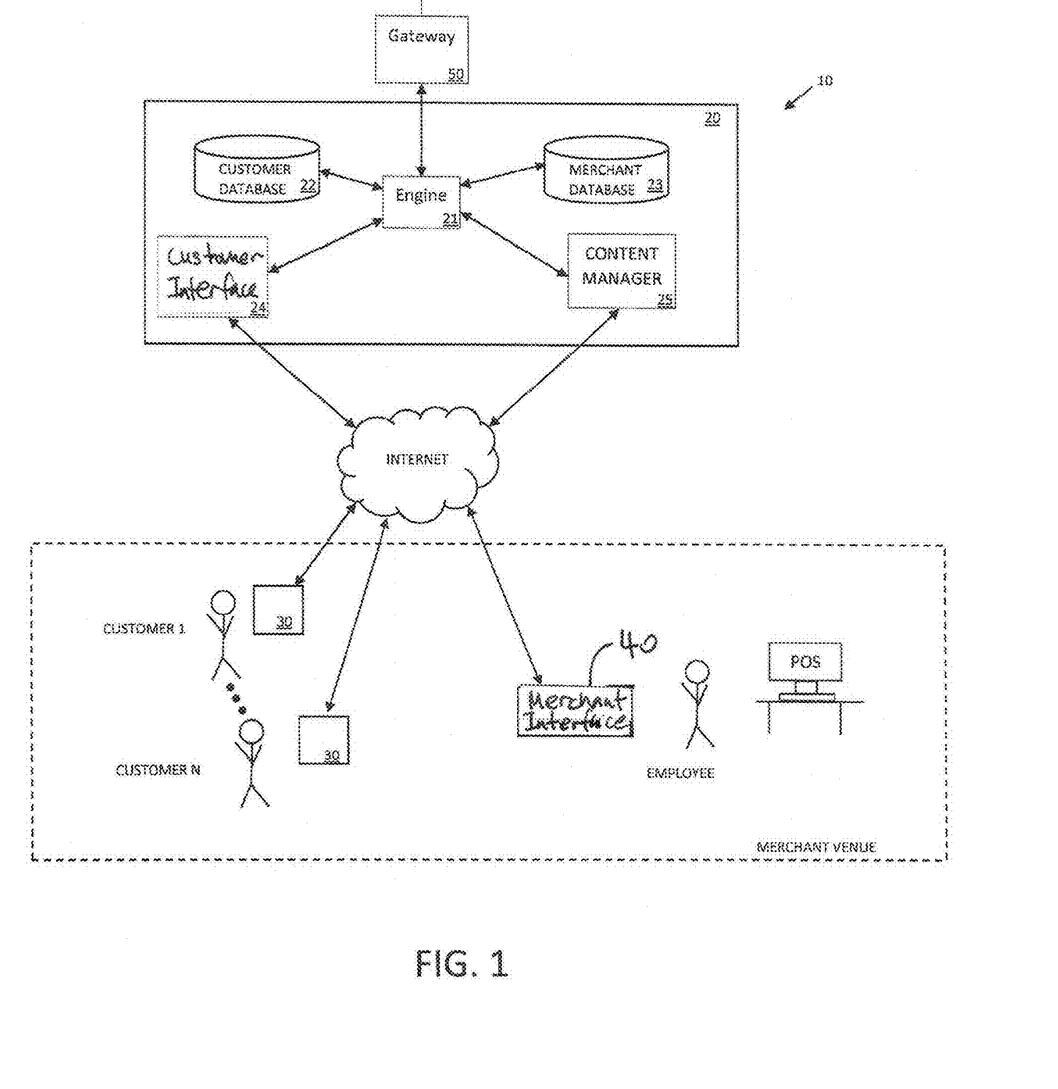
FIG. 1 illustrates an exemplary computer-based system for implementing embodiments of the present inventive concept.

FIG. 1 illustrates an exemplary system for implementing embodiments of the present inventive concept. In FIG. 1, system 10 includes a server 20 connected to the Internet or other computer-based communications network, along with any number of customer devices 30 and merchant devices 40. The customer devices 30 can be any computational devices such as smartphones, tablet computers, laptops, or the like. The customer devices 30 can access websites through the Internet, including those hosted by server 20, and allow their users to exchange information with these websites. The merchant devices 40 can be any computational device, mobile or otherwise, including personal computers and the like. Each merchant device 40 can run one or more merchant interface programs for interfacing and communicating with the server 20.

The server 20 includes an engine or processor 21, a customer database 22 and a merchant database 23, and hosts any number of merchant-specific interfaces 24. The server 20 also runs a content manager 25. The various databases can exist as separate databases, or may be combined in any manner. That is, one or more databases can contain and/or take on the roles of any one or more of the databases 22, 23. The various elements 22, 23, 24, and 25 can also be implemented on multiple servers rather than just one server 20. Additionally, the server 20 can be implemented as one or more physical servers, or can be implemented as one or more virtual servers.

The system 10 also includes a gateway 50, which is a known hosted software product that provides integration between the merchant-specific customer interface 24 and other elements of an electronic payment processing network. These elements include credit card networks and bank servers. These other elements and their interactions with gateway 50 are known.

FIG. 1 also conceptually illustrates operation of system 10. In operation, any number of customers (customer1 . . . customerN) may enter the Merchant Venue, which may as a nonlimiting example be a restaurant. Once onsite, customer1 for example may load the merchant-specific customer interface 24 on his or her customer device 30, login, and notify an Employee of the Merchant Venue that they are paying via the website. Having logged in, merchant-specific customer interface 24 informs the merchant device 40, so that customer1 now shows up on the Merchant Venue interface running on merchant device 40. The Employee keeps track of customer1's order, possibly on the POS or by some other method, and enters the total under customer1's name on merchant device 40, whereupon customer1 can pay this total, plus any tip, through his/her customer device 30 at any time, without need for the Employee to visit customer1's table. Payment is processed through the gateway 50, which notifies the server 20 when payment has gone through. The server 20 in turn directs the merchant interface on device 40 to indicate that the customer has paid, whereupon the Employee can close the ticket. Records of each order/visit/transaction may be stored in the databases 22 and 23, so that the system 10 may keep a record of each customer's usages/transactions as well as each merchant's. At the end of his or her shift, the Employee can run a report from device 40 of transactions, totals and tips, etc. and attach this report to a corresponding report from the POS, or simply retain the report for the Merchant's records.

Figure 2:
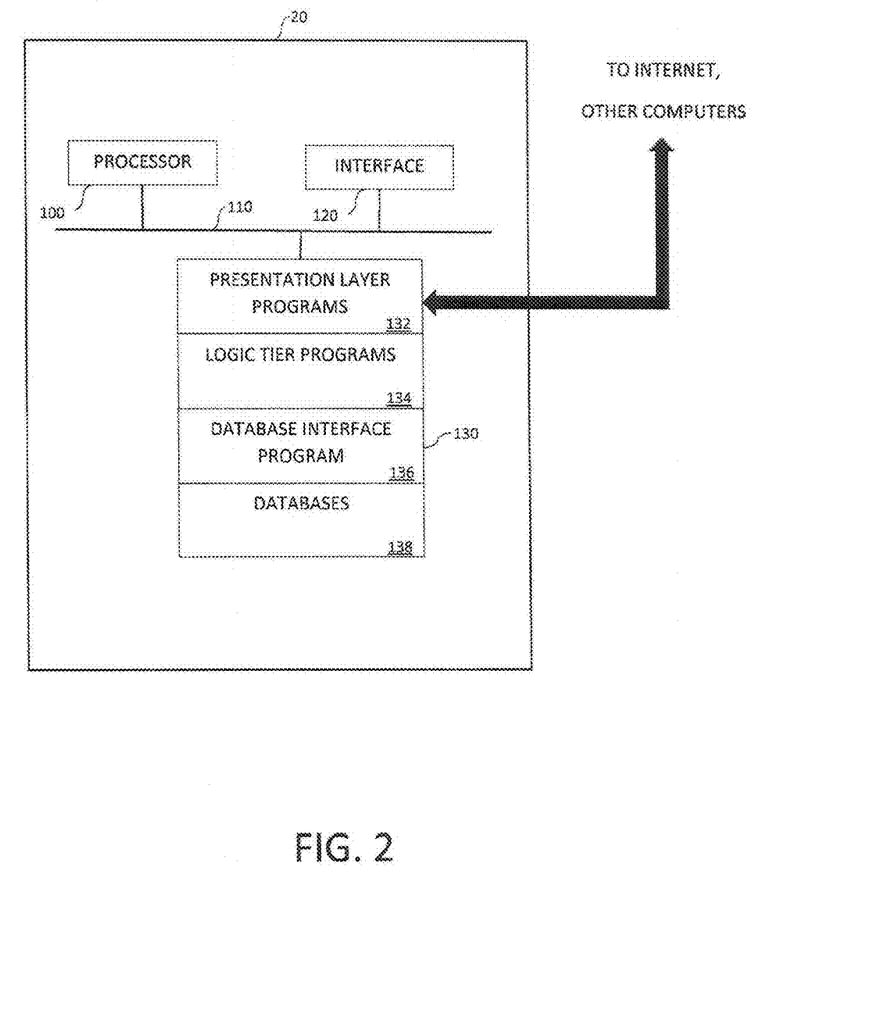
FIG. 2 conceptually illustrates further details of a server for implementing embodiments of the present inventive concept.

While the server 20 and various other computational devices of FIG. 1 can be constructed in any manner, and contain any programs suitable for operation as above and below, FIG. 2 illustrates further details of one embodiment of server 20. Here, server 20 includes a processor 100, bus 110, interface 120, and memory 130. The processor 100, interface 120, and memory 130 are in communication across bus 110. The processor 100 executes instructions contained in the programs of memory 130, while the interface 120 allows communication with the other computational devices of FIG. 1 via the Internet or other electronic communication medium. The processor 100, interface 120, and programs of the memory 130 which carry out the above and below processes collectively can be thought of as making up the engine 21.

The memory 130 stores a number of programs, including presentation layer programs 132, logic tier programs 134, database interface programs 136, and databases 138. The databases 138 may include any of the databases used to organize and store information, including the above described databases 22 and 23. The database interface programs 136 may include those programs configured to act as an interface for the databases 138 to the logic tier 134, as is known. The logic tier programs 134 are database access layer programs, and access the database interface programs 136 as well as other remote programs (such as financial transaction, authentication, etc. programs) to retrieve desired information stored in the databases 138 or store information as appropriate. The logic tier programs 134 transfer information between end user application programs and databases 138, to allow for the transfer of information between the databases 138 and end users as described herein. The construction of such logic tier programs 134 is known. The presentation layer programs 132 are application programs providing an interface to end users, and include programs and other code such as those of merchant-specific customer interface (e.g., websites) 24 and content manager 25.

The web-based design of the server 20 (engine 21), customer device 30, and merchant device 40 make the system platform independent, allowing a common interface readily available on a wide variety of devices ranging from notebooks and computers to tablets and mobile devices. This platform-independence makes the system versatile and easier to adapt and deploy regardless of the specific POS systems involved.

Figure 3:
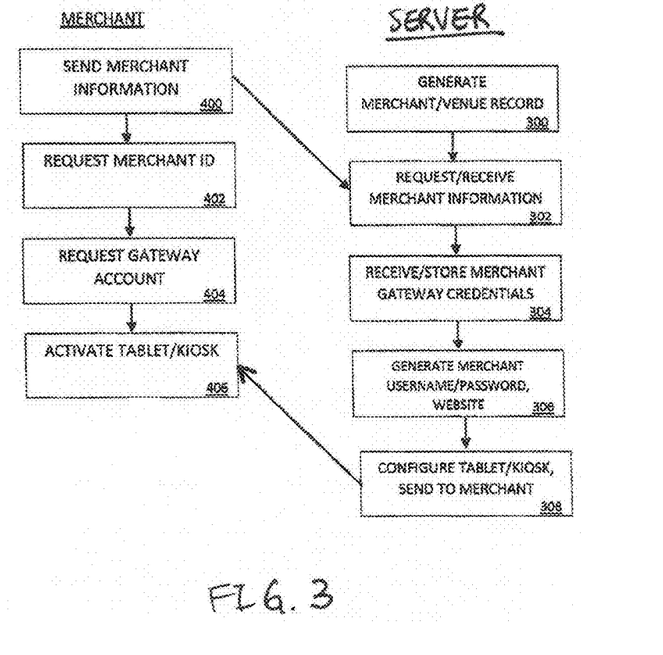
FIG. 3 is a flowchart illustrating steps taken by merchants and a backend system in accordance with embodiments of the present inventive concept.

FIG. 3 is a flowchart illustrating how a merchant gets set up with the server 20. An exemplary merchant setup process is described. A merchant signs up for the service described herein, via content manager 25, which is a control panel or interface allowing for automated merchant signup. Upon signup, a record or account specific to the Merchant Venue is generated and stored in merchant database 23 (Step 300). The content manager 25 then prompts the merchant to enter any other desired merchant information, which can be any desired information, such as a physical address, email address, etc. The merchant may also enter other information through content manager 25, such as a logo, graphics, color scheme, and other content like a description of their venue or other text. All this information is stored in database 23 to be associated with the merchant-specific record (Step 302).

The content manager 25 then prompts the merchant to apply for an account with gateway 50, which is a gateway that is integrated with system 10. Once gateway approval is made, the gateway 50 sends merchant-specific gateway credentials to server 20, where they are stored along with the merchant record in database 23 (Step 304). At this point, the engine 21 generates a unique merchant username and password (Step 306), which are transmitted to the merchant (not shown). The engine 21 at this point may also generate a merchant-specific customer interface 24 using the stored merchant logo, color scheme, graphics, etc., which is linked to the merchant record and stored in the presentation layer programs 132 for execution by a customer. The merchant-specific customer interface 24 may be automatically generated by the content manager 25 in known manner, or may be custom-generated by a user.

Optionally, a merchant device 40 (any computing device with network connection capability, including but not limited to a tablet) may be configured with a mobile app version of the above-described interface, and sent to the Merchant Venue for use as previously described (Step 308). This mobile app may be programmed to allow the merchant device 40 to act as a kiosk, displaying a control panel that is logged in to the merchant's account and in communication with engine 21 to allow the merchant to enter and receive information as above. A particular Merchant Venue may be given multiple merchant devices 40 (e.g., tablets) to facilitate convenient use by multiple Employees.

Steps 400-406 illustrate the merchant setup process from the point of view of the merchant, and corresponds to Steps 300-308 from the point of view of the system 10. Subsequent merchant use is described in reference to FIG. 4 below. As to setup, when the merchant desires to sign up for the service described herein, the merchant logs into the content manager 25 and enters the requested information, i.e. identifying information, logo, graphics, etc. (Step 400, corresponding to Step 302). The merchant may then optionally apply for a secondary merchant ID (Step 402) that can be used in processing some online payments. The merchant is also prompted to enter all information for requesting a gateway account (Step 404). Upon completion of these Steps, the merchant may be sent a computing device (e.g., a tablet 40) configured with an app as in Step 308 and set up for the above mentioned transactions (Step 406).

Figure 4:
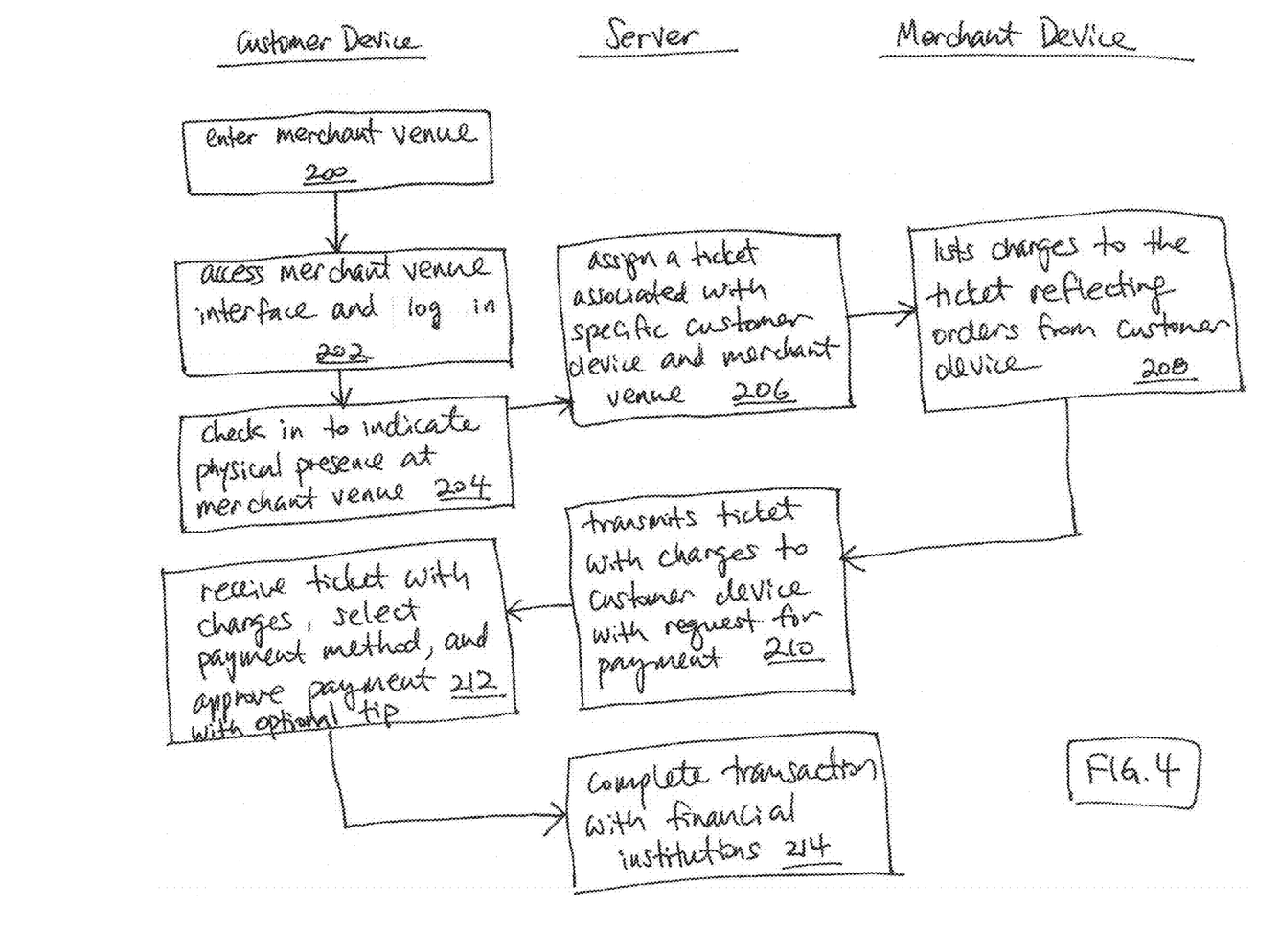
FIG. 4 is a flowchart illustrating the payment processing procedure in accordance with embodiments of the present inventive concept.

FIG. 4 illustrates details of the process by which customers conduct transactions at merchant venues. As above, a restaurant is used as the exemplary Merchant Venue, although embodiments of the invention contemplate any commercial establishment. The customer may enter the particular Merchant Venue (Step 200), whereupon he or she is informed of the Merchant Venue's merchant-specific website. The customer may then access this merchant-specific customer interface 24 using his or her customer device 30 and log in (Step 202). Either as part of the log-in process or as a separate step, the customer checks into the merchant venue via the merchant-specific customer interface 24 (Step 204). As above, checking in prompts the server 20 to update the merchant device 40, such that the username of the logged-in customer is now indicated as present onsite. The customer may then notify an Employee of the customer's username, and that he/she will be paying through the website electronically. The server 20, upon receiving the login information and the check-in confirmation, assigns a ticket to the customer who checked in (e.g., Customer 1) (Step 206). Once the meal is finished, an Employee enters the customer's total bill amount on the merchant device 40 and associates it with Customer 1 (Step 208). The ticket that identifies Customer 1 and the amount owed is transmitted to server 20 and on to the customer device 30 along with a request to approve payment (Step 210). Customer 1 may review the charges on the ticket and approve payment, for example by entering a payment (credit, debit, gift) card number or a bank account number, as well as the total payment amount, which may include a tip in addition to the amount entered by the Employee (Step 212). Upon to the customer's approval of the transaction, the server 20 and gateway 50 complete the financial transaction in known manner. When the gateway 50 returns an indication that payment has occurred and the transaction has been completed, the engine 21 performs actions such as emailing or otherwise transmitting a receipt to the customer (Step 214), completing the process.

Financial transactions may be completed in any manner. For example, when payment card information is entered such as at Step 212, the system 10 may store this information at a secured payment page hosted by gateway 50. That is, gateway 50 may store user card information rather than server 20, perhaps for security purposes. The payment card information may be tokenized to allow a customer to use stored cards across the network without having to re-enter the payment card information, while providing extra security and convenience. Completion of a financial transaction may thus involve gateway 50 returning a tokenized ID for this particular transaction, which is saved in database 22. For security reasons, only the token, or a card identifier such as the last four digits of the card number, and expiration date may be retained in database 22. The token may be associated with a master merchant account associated with system 10 and stored on gateway 50, rather than being associated with the particular merchant. This allows customers with a user account stored in server 20 to store payment methods and use them across multiple different merchant interfaces, as a common token is used in each transaction at each different merchant.

In addition to allowing customers to make paperless payments, system 10 may also act as a digital wallet. For example, when customers enter their payment card information at Step 212, the server 20 may prompt the customer as to whether he or she wishes to keep their card information on file for use in future transactions. If the customer agrees via the server 20, the engine 21 stores this information in the gateway 50, whereupon it can be retrieved for use in future transactions. In this manner, information on multiple different cards may be stored for the same user, associated with that username in database 22. The user can thus be allowed to pick which stored card he/she wishes to use for any given transaction, and the server 20 and gateway 50 can carry out the transaction using that selected card. The user may also be displayed a list of his/her cards for which information is stored, where the user can select any card for removal (deletion from database 22) or designation as Primary. Removal may also remove the card information from the user's digital wallet on the gateway 50, if one exists.

If the user has not logged in to server 20 before, Step 204 may also include prompting the user or customer to create a new user account, with for example a username and password. This user information is then stored along with subsequently-entered card information in customer database 22.

The hosted merchant-specific customer interface 24 provides the ability to assign a ticket to a customer and for the customer to acknowledge and approve a payment for the assigned ticket in a centralized manner. This centralization enables bug or feature updates to be handled in a controlled and distributed manner to all supported locations.

The system as described herein provides protection to both the customer and the merchant. Once a customer agrees to pay for an item and/or service and the merchant agrees to provide these items and/or services, this mutual agreement establishes a "contract." This contract is evidenced by the consumer checking in (e.g., agreeing to the terms of the contract in the process) and the server assigning a ticket with the payment amount that is due. In the event that a consumer leaves the merchant venue without payment, the merchant has the right to force the fulfillment of the contract by reminding the customer of his/her obligation to make a payment even after the customer leaves the merchant venue. The customer is also protected because s/he can review the bill at a time that is convenient for him/her.

Once the merchant device 40 is received at the Merchant Venue, it may be used to complete transactions in tandem with the merchant-specific customer interface 24. In particular, once a customer notifies an Employee that he/she is paying via the merchant-specific customer interface 24 and gives his/her username, the Employee selects this username (Step 408) from the list of users displayed on tablet 40 (corresponding to users logged in through the merchant-specific customer interface 24, whose usernames are transmitted to tablet 40 via engine 21 at Step 206). The Employee then assigns an Employee name (e.g., waiter name) and table number to the customer's username via prompts from the app on tablet 40 (Step 410). Once the customer has completed his/her meal, the Employee/waiter totals up the customer's bill, such as by hand or via the POS, and enters the total in the app on tablet 40 (Step 412). Once the customer's payment is completed as through Step 212 above (Step 414), the Employee can close out the customer's ticket (Step 416) and, at a later time, run a report if desired (Step 418), whereupon the process ends. If payment is unsuccessful after a predetermined amount of time, or if the gateway 50 returns a payment declined message, the process returns to Step 414 where the customer is allowed to retry payment, perhaps with the option to try a different card.

Embodiments of the invention thus describe a system that allows for conducting merchant transactions independent of a POS system (note that no part of system 10 is part of the POS system or exchanges information electronically with the POS, or at least none is required to). The system may employ both a merchant venue-specific website and a mobile app. A customer at the merchant venue logs into the customer website with his or her mobile phone, and the customer interface is automatically notified of the login. The venue keeps track of the customer's total bill amount in any way, and enters it into the customer interface, which in turn updates the customer interface with the total amount owed. The customer can then pay his or her bill through the customer interface, via his/her phone. In this manner, a quick and easy payment system is implemented, allowing users to pay with the card or payment method of their choice, without need for a POS system or independent of an existing POS system and without need for downloading or installing any additional software on their device.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings.

The system disclosed herein offers flexibility to customers. All of the flexibility of payment methods (credit cards, debit cards, etc.) that a patron has available to him can be used at any location where the system is offered, and the cardholder information needs only be entered in one place, one time. The system allows a patron to use a common, familiar interface for payment at many different locations.

The token-based payment architecture provides a security-centric solution that is designed to protect all of the members involved in a financial transaction (i.e., the patron, the venue, and the financial institutions). In a token-based transaction there is no vital authentication information such as credit card number of bank account information that is ever shared, exchanged, or otherwise exposed from one side of the transaction to the other party or secondary parties involved.

The embodiments were chosen and described in order to best explain the principles of the inventive concept and its practical applications, to thereby enable others skilled in the art to best utilize the inventive concept and various embodiments with various modifications as are suited to the particular use contemplated. Also, individual features of any of the various embodiments or configurations described above can be mixed and matched in any manner, to create further embodiments contemplated by the inventive concept.

What is claimed is:

1. A computer-implemented method of conducting transactions between a customer and a merchant independently of a point-of-sale system, comprising:
    receiving, via a server over a network, a request from a web browser to open a merchant account;
    creating, via the server, the merchant account with a gateway that provides integration between websites and a merchant-specific customer interface associated with the merchant account, wherein the server hosts a plurality of merchant-specific customer interfaces;
    receiving login information via the merchant-specific customer interface from a customer account associated with the customer at a merchant venue associated with the merchant-specific customer interface;
    storing merchant account information and customer account information in a database;
    assigning, via the server, a ticket to the customer account;
    associating a bill amount received by the merchant-specific customer interface with the ticket;
    receiving, via the merchant-specific customer interface, an approval to carry out a financial transaction for at least the bill amount using the customer account; and
    receiving, from the gateway, a notification that the financial transaction is completed using the customer account, wherein the notification from the gateway includes a tokenized identifier (ID) for the financial transaction.

2. The computer-implemented method of claim 1, wherein the customer account is associated with a tokenized payment card number.

3. The computer-implemented method of claim 2, wherein the tokenized payment card number is stored for repeated use.

4. The computer-implemented method of claim 1, further comprising storing the tokenized identifier.

5. The computer-implemented method of claim 3, wherein the tokenized payment card number is a selection out of a plurality of payment card numbers stored in the gateway.

6. The computer-implemented method of claim 1, wherein the customer account is associated with two or more of: a credit card number, a debit card number, a gift card number, and a bank account number.

7. The computer-implemented method of claim 1 further comprising transmitting to the merchant account an indicator that the financial transaction is successfully completed.

8. The computer-implemented method of claim 1 further comprising receiving, from the merchant account, details of charges adding up to the bill amount as part of the ticket.

9. The computer-implemented method of claim 1, wherein the login information is received from a customer device while the customer device is at the merchant venue, and the approval to carry out the financial transaction is received from the customer device while the customer device is away from the merchant venue.

10. One or more non-transitory computer-readable media collectively storing instructions that, when executed, cause one or more computers to perform a method of conducting transactions between a customer and a merchant independently of a point-of-sale system, the instructions comprising:

instructions to receive, via a server over a network, a request from a web browser to open a merchant account;

instructions to create, via the server, the merchant account with a gateway that provides integration between websites and a merchant-specific customer interface associated with the merchant account, wherein the server hosts a plurality of merchant-specific customer interfaces;

instructions to receive login information via the merchant-specific customer interface from a customer account associated with the customer at a merchant venue that is associated with the merchant-specific customer interface;

instructions to assign, via the server, a ticket to the customer account;

instructions to associate a bill amount received by the merchant-specific customer interface with the ticket;

instructions to receive, via the merchant-specific customer interface, an approval to carry out a financial transaction for at least the bill amount using the customer account; and instructions to receive, from the gateway, a notification that the financial transaction is completed using the customer account, wherein the notification from the gateway includes a tokenized identifier (ID) for the financial transaction.

11. The non-transitory computer-readable media of claim 10, wherein the customer account number is associated with a tokenized payment card number.

12. The non-transitory computer-readable media of claim 11, wherein the tokenized payment card number is stored for repeated use.

13. The non-transitory computer-readable media of claim 10, further comprising storing the tokenized identifier.

14. The non-transitory computer-readable media of claim 12, wherein the tokenized payment card number is a selection out of a plurality of payment card numbers stored in the gateway.

15. The non-transitory computer-readable media of claim 10, wherein the customer account is associated with two or more of: a credit card number, a debit card number, a gift card number, and a bank account number.

16. The non-transitory computer-readable media of claim 10 further comprising instructions to transmit to the merchant account an indicator that the financial transaction is successfully completed.

17. The non-transitory computer-readable media of claim 10 further comprising instructions to receive, from the merchant account, details of charges adding up to the bill amount as part of the ticket.

18. The non-transitory computer-readable media of claim 10, wherein the login information is received from a customer device while the customer device is at the merchant venue, and the approval to carry out the financial transaction is received from the customer device while the customer device is away from the merchant venue.

\* \* \* \* \*